United States Patent
Willmot et al.

(10) Patent No.: US 12,460,579 B2
(45) Date of Patent: Nov. 4, 2025

(54) PROPULSION SYSTEM COMPRISING A HYDROGEN-BURNING GAS TURBINE ENGINE

(71) Applicant: ROLLS-ROYCE plc, London (GB)

(72) Inventors: Michael C Willmot, Sheffield (GB); Richard Peace, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/916,983

(22) Filed: Oct. 16, 2024

(65) Prior Publication Data
US 2025/0154902 A1    May 15, 2025

(30) Foreign Application Priority Data
Nov. 14, 2023  (GB) .................................... 2317413

(51) Int. Cl.
| | |
|---|---|
| F02C 7/00 | (2006.01) |
| F02C 7/22 | (2006.01) |
| F02C 7/268 | (2006.01) |
| H01M 8/04082 | (2016.01) |

(52) U.S. Cl.
CPC ............... *F02C 7/22* (2013.01); *F02C 7/268* (2013.01); *H01M 8/04201* (2013.01); *F05D 2220/323* (2013.01); *F05D 2260/213* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 5,129,599 A | 7/1992 | Wollen | |
| 5,230,717 A * | 7/1993 | Ogawa | ........................ C10J 3/86 |
| | | | 48/67 |
| 11,668,243 B2 | 6/2023 | Muldoon et al. | |
| 11,745,891 B2 | 9/2023 | Rheaume et al. | |
| 11,760,502 B2 | 9/2023 | Palmer | |
| 2002/0092562 A1* | 7/2002 | Kami | ............... B60K 15/03006 |
| | | | 137/312 |
| 2005/0000805 A1 | 1/2005 | Takahashi | |

(Continued)

FOREIGN PATENT DOCUMENTS

| | | |
|---|---|---|
| EP | 3995679 A1 | 5/2022 |
| EP | 4095369 A3 | 3/2023 |

(Continued)

*Primary Examiner* — Edwin Kang
(74) *Attorney, Agent, or Firm* — Oliff PLC

(57) ABSTRACT

A propulsion system comprises a propulsive hydrogen-burning gas turbine engine, a first tank storing liquid hydrogen with an ullage and a first fuel line including a fuel pump and a vaporiser, the first fuel line providing gaseous hydrogen to the engine during operation of the system. A second tank storing gaseous hydrogen is coupled by a second fuel line to the first fuel line at a position thereon between the vaporiser and the engine, providing for engine start-up (when the vaporiser is inoperative) and power-boosting during operation of the system. A duct connects gaseous hydrogen within the second tank to the ullage in the first tank in order maintain pressure in the first tank as liquid hydrogen within it is depleted, preventing cavitation of liquid hydrogen within the fuel pump.

15 Claims, 2 Drawing Sheets

(56) References Cited

U.S. PATENT DOCUMENTS

| | | | |
|---|---|---|---|
| 2014/0345198 A1* | 11/2014 | Haari | C10J 3/485 |
| | | | 48/210 |
| 2015/0344144 A1 | 12/2015 | Kamath et al. | |
| 2015/0344145 A1 | 12/2015 | Epstein et al. | |
| 2021/0340908 A1 | 11/2021 | Boucher et al. | |
| 2022/0093948 A1* | 3/2022 | Holland | B64D 41/00 |
| 2022/0099299 A1 | 3/2022 | Carrotte et al. | |
| 2022/0145801 A1* | 5/2022 | McCurdy Gibson | F02C 3/22 |
| 2022/0307428 A1 | 9/2022 | Sibbach et al. | |
| 2022/0381183 A1* | 12/2022 | Smith | F02C 3/20 |
| 2023/0045911 A1 | 2/2023 | Smith | |
| 2023/0122350 A1* | 4/2023 | Minas | F02C 7/224 |
| | | | 60/39.281 |
| 2023/0128287 A1 | 4/2023 | Boucher et al. | |
| 2023/0184130 A1* | 6/2023 | Moore | F02C 7/32 |
| | | | 290/52 |
| 2023/0339621 A1 | 10/2023 | Sarkar | |
| 2023/0366353 A1 | 11/2023 | Miller et al. | |
| 2024/0011440 A1* | 1/2024 | Owoeye | F28D 20/021 |
| 2024/0021852 A1* | 1/2024 | Brutoco | F17C 7/04 |
| 2024/0309805 A1 | 9/2024 | Benjamin et al. | |
| 2024/0309995 A1 | 9/2024 | Minas | |

FOREIGN PATENT DOCUMENTS

| | | |
|---|---|---|
| EP | 4 361 419 A1 | 5/2024 |
| FR | 3 114 355 A1 | 3/2022 |
| FR | 3135253 A1 | 11/2023 |
| JP | 2000-110994 A | 4/2000 |
| WO | 2016/047109 A1 | 3/2016 |

\* cited by examiner

PROPULSION SYSTEM COMPRISING A HYDROGEN-BURNING GAS TURBINE ENGINE

CROSS-REFERENCE TO RELATED APPLICATIONS

This application is based upon and claims the benefit of priority from United Kingdom Patent Application No. GB 2317413.9, filed on Nov. 14, 2023, the entire contents of which are incorporated herein by reference.

BACKGROUND OF THE INVENTION

Technical Field

This disclosure relates to a propulsion system comprising a hydrogen-burning gas turbine engine and to an aircraft comprising the propulsion system.

Description of Related Art

In order to reduce or eliminate emissions of carbon dioxide, use of hydrogen as an alternative to hydrocarbon fuel in gas turbine engines has been proposed, although historically this has only been practical in land-based installations. More recently there has been interest in aircraft having propulsion systems comprising hydrogen-burning gas turbine engines fueled by hydrogen initially stored at cryogenic temperatures, as either a compressed gas, a supercritical fluid, or a liquid. Such fuel requires heating prior to delivery to an engine, both to permit combustion and to prevent icing.

However, pumping hydrogen within such systems, particularly where the hydrogen is stored as a liquid, presents technical challenges. These challenges include the high power required to pump the hydrogen at the necessary flow rates and pressures, and the risk of cavitation within a fuel pump where the pump operates on liquid hydrogen.

BRIEF SUMMARY

According to a first example, a propulsion system comprises:
(i) a propulsive, hydrogen-burning gas turbine engine;
(ii) a first tank arranged to store liquid hydrogen with an ullage;
(iii) a first fuel line arranged to convey hydrogen from the first tank to combustion apparatus of the propulsive, hydrogen-burning gas turbine engine, the first fuel line including a fuel pump and a vaporiser,
wherein the fuel pump is arranged to transport liquid hydrogen from the first tank to the vaporiser and the vaporiser is arranged to vaporise the liquid hydrogen utilising heat from the propulsive, hydrogen-burning gas turbine engine and provide resulting gaseous hydrogen to combustion apparatus of the propulsive, hydrogen-burning gas turbine engine and wherein the propulsion system further comprises:
(iv) a second tank arranged to store compressed gaseous hydrogen;
(v) a second fuel line arranged to convey gaseous hydrogen between the second tank and the first fuel line at a position thereon intermediate the vaporiser and the combustion apparatus; and
(vi) a duct which in operation of the propulsion system connects pressurised gaseous hydrogen stored in the second tank to the ullage of the first tank.

During operation of the propulsion system, the duct connecting the second tank to the ullage of the first tank ensures that the pressure in the first tank is maintained at a value which is adequate to prevent cavitation within the fuel pump as the first tank is depleted of liquid hydrogen.

The system may further comprise a fuel cell stack and a third fuel line arranged to convey gaseous hydrogen from the second tank to the fuel cell stack, the fuel pump being an electric pump and the fuel cell stack being arranged to provided electrical power to the fuel pump.

Alternatively, or in addition, the fuel cell stack may be arranged to provide electrical power to an electric starter-motor comprised in the propulsive hydrogen-burning gas turbine engine.

The first tank and a portion of the first fuel line extending from the first tank to the vaporiser may be contained within a first volume which is arranged for evacuation during operation of the propulsion system. This arrangement provides thermal insulation to maintain liquid hydrogen withdrawn from the first tank in liquid form until it reaches the vaporiser. Where the system comprises a fuel cell stack and a third fuel line arranged to convey gaseous hydrogen from the second tank to the fuel cell stack, the system may further comprise an electric vacuum pump arranged to receive electrical power from the fuel cell stack and substantially evacuate the first volume.

The system preferably comprises apparatus for maintaining an inert atmosphere within a second volume which includes a portion of the first fuel line including the vaporiser. This arrangement prevents formation of potentially explosive mixtures of air and gaseous hydrogen. The apparatus may comprise a third tank arranged to store compressed gaseous nitrogen and a duct coupling the third tank to the second volume.

The propulsion system may further comprise apparatus arranged to selectively convey gaseous hydrogen from the second tank and gaseous nitrogen from the third tank to the first fuel line at a position thereon between the first tank and the fuel pump, thus allowing that portion of the first fuel line between said position and the combustion apparatus to be purged of air and primed with gaseous hydrogen on start-up, and purged of hydrogen on shut-down as described below.

Where the system comprises a fuel cell stack and a third fuel line arranged to convey gaseous hydrogen from the second tank to the fuel cell stack, the system may further comprise an electrical power distribution system, the fuel cell stack being arranged to provide electrical power to the electrical power distribution system. Alternatively, the propulsion system may further comprise an auxiliary hydrogen-burning gas turbine engine, an electrical generator, a power distribution system and a third fuel line arranged to convey gaseous hydrogen from the second tank to combustion apparatus of the auxiliary hydrogen-burning gas turbine engine, the electrical generator being arranged to be driven by the auxiliary hydrogen-burning gas turbine engine and provide electrical power to the power distribution system.

The vaporiser may comprise a heat exchanger arranged to receive compressor bleed air from the propulsive, hydrogen-burning gas turbine engine and transmit heat from the compressor bleed air to liquid hydrogen within the first fuel line. Alternatively, the vaporiser may comprise a heat-exchanger arranged to transmit heat from oil within an oil system of the propulsive, hydrogen-burning gas turbine engine to liquid hydrogen within the first fuel line. Alternatively, the vaporiser may comprise a heat-exchanger arranged to transmit heat from the exhaust flow of the propulsive, hydrogen-burning gas turbine engine to liquid hydrogen within the first fuel line.

According to a second example, an aircraft comprises a propulsion system according to the first example. The aircraft may be an aeroplane or a helicopter.

BRIEF DESCRIPTION OF THE SEVERAL VIEWS OF THE DRAWINGS

Examples are described below with reference to the accompanying drawings in which.

DETAILED DESCRIPTION

Figure 1:
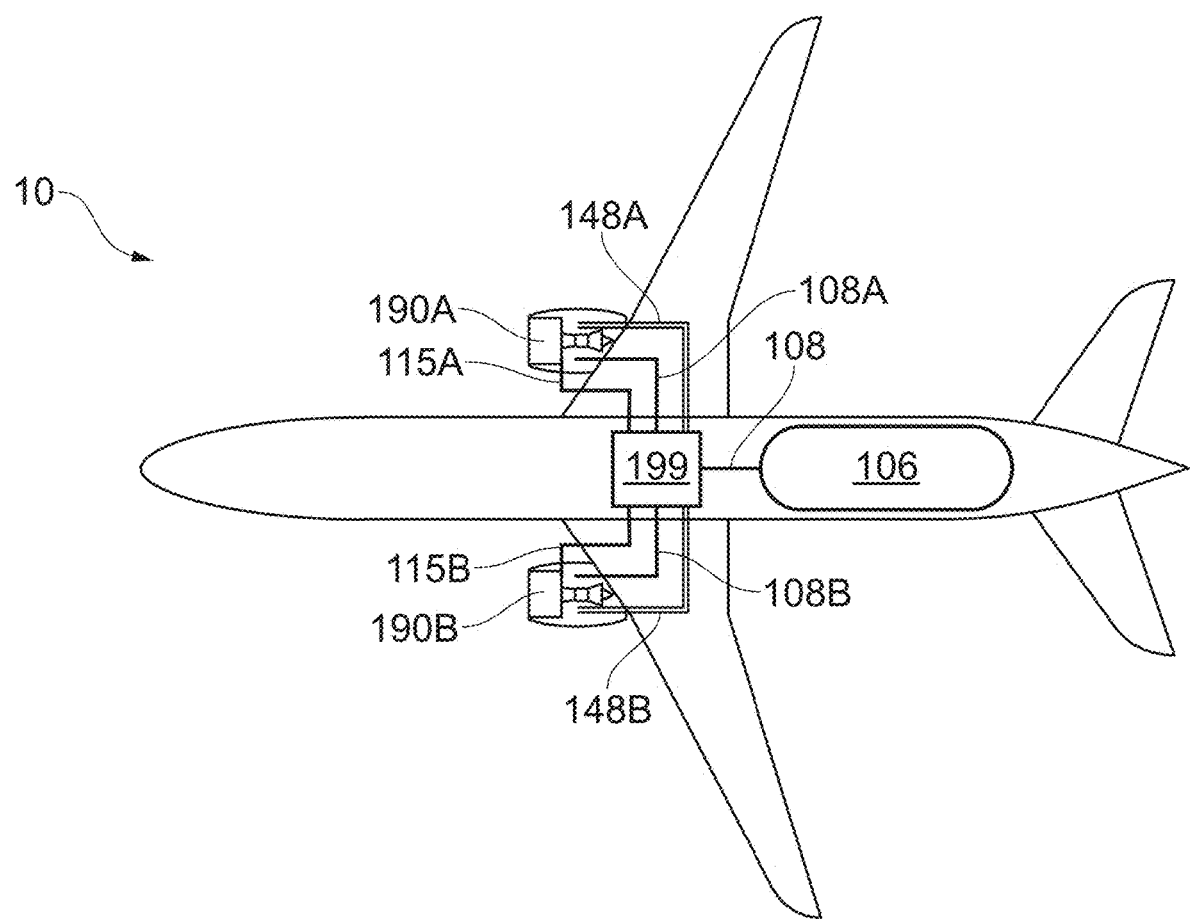
FIG. 1 shows an aircraft of the invention.
Figure 2:
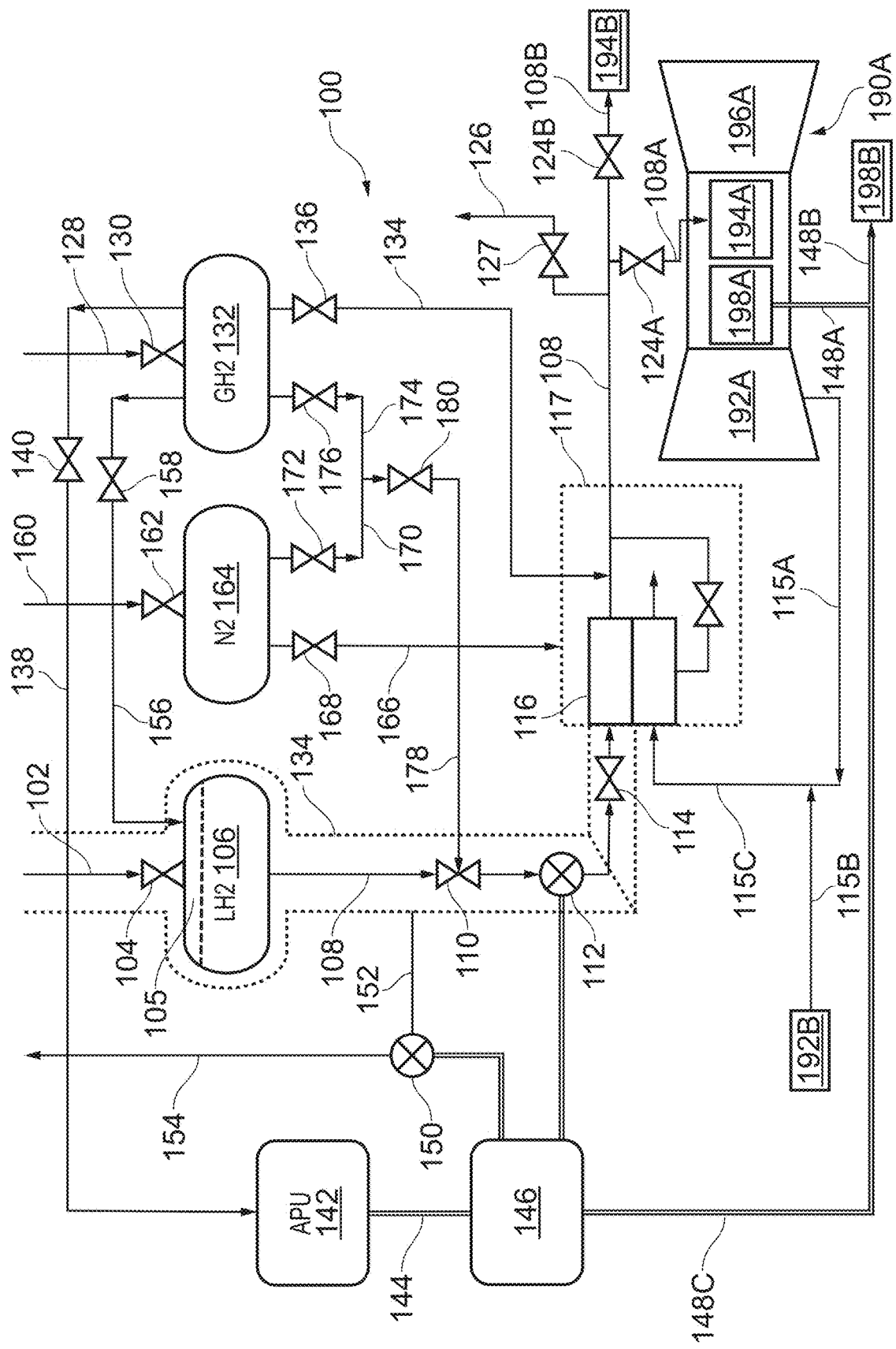
FIG. 2 shows a propulsion system comprised in the aircraft of FIG. 1.

Referring to FIGS. 1 and 2, an aircraft 10 includes a propulsion system 100 comprising first and second propulsive, hydrogen-burning gas turbine engines 190A, 190B each of which is mounted under a respective wing of the aircraft 10. The propulsion system 100 further comprises a first tank 106 storing liquid hydrogen, a first fuel line 108 arranged to convey hydrogen fuel from the first tank 106 via a balance-of-plant 199 of the propulsion system 100 and terminal portions 108A, 108B of the first fuel line 108 to the hydrogen-burning gas turbine engines 190A, 190B. The balance-of-plant 199 in FIG. 1 corresponds to all parts of the system 100 shown in FIG. 2 except those shown explicitly in FIG. 1. The first engine 190A comprises compressor and turbine sections 192A, 196A, combustion apparatus 194A and an electric starter-motor 198A (which may also function as a generator). Similarly the second engine 190B comprises a compressor section 192B, a turbine section (not shown), combustion apparatus 194B and an electric starter-motor 198B (which may also function as a generator).

Liquid hydrogen is stored within the first tank 106 with an ullage 105. The first tank 106 has an associated input duct 102 incorporating a valve 104 via which the first tank 106 may be filled with liquid hydrogen. The first fuel line 108 of the propulsion system 100 includes an electric fuel pump 112, a vaporiser 116, a vent duct 126 and valves 110, 114, 127, 124A, 124B. In operation of the propulsion system 100, liquid hydrogen drawn from the first tank 106 is pumped to the vaporiser 116 where it is vaporised and the resulting gaseous hydrogen passed to combustion apparatus 194A, 194B of the hydrogen-burning gas turbine engines 190A, 190B. The vaporiser 116 is a heat-exchanger which receives bleed air from the compressor sections 192A, 192B of the engines 190A, 190B via ducts 115A, 115B, 115C and transmits heat from the bleed air to liquid hydrogen within the fuel line 108 in order to vaporise the liquid hydrogen. In variants of the propulsion system 100, the vaporiser 116 is a heat-exchanger arranged to transmit heat from oil within an oil system comprised in one of the engines 190A, 190B to liquid hydrogen within the first fuel line 108. In other variants, the vaporiser is recuperator heat-exchanger arranged to transmit heat from the exhaust flow of one of the engines 190A, 190B to liquid hydrogen within the first fuel line 108.

Engines 190A, 190B generate sufficient heat to vaporise liquid hydrogen within the fuel line 108 after being operational for a certain warm-up period after start-up; a second fuel tank 132 storing pressurised gaseous hydrogen at several hundred bar (e.g. 100 bar or more) is therefore provided, the second tank 132 being coupled by a second fuel line 134 to the first fuel line 108 at a position thereon intermediate the vaporiser 116 and the combustion apparatus 194A, 194B. Gaseous hydrogen from the second tank 132 is used to start the engines 190A, 190B (in conjunction with starter-motors 198A, 198B) and also allows the engines 190A, 190B to operate at higher power for demanding operations such as take-off and climbing. During normal operation of the propulsion system 100, a portion of the flow of gaseous hydrogen generated by the vaporiser 116 may be stored in the tank 132 thus replacing gaseous hydrogen drawn from the second tank 132 on start-up or during high-power operation of the propulsion system 100. The flows of liquid and gaseous hydrogen to the vaporiser 166 and from the second tank 132 are controlled by valves 114, 136 respectively. The second tank 132 is filled via an input duct 128 comprising a valve 130.

The propulsion system 100 further comprises an APU 142, the APU 142 being hydrogen-fueled fuel cell stack, such as a proton-exchange (or polymer electrolyte) membrane (PEM) fuel cell stack for example, comprising one or more individual fuel cells. A third fuel line 138 incorporating a flow-control valve 140 couples the second tank 132 to the fuel cell stack APU 142. Electrical power output by the fuel cell stack APU 142 is provided to a power distribution system 146 via electrical connection 144; the power distribution system 146 distributes electrical power to the fuel pump 112, the two electric starter-motors 198A, 198B (via electrical connections 148A, 148B, 148C) and an electric vacuum pump 150 arranged to substantially evacuate a first volume 134 of the propulsion system 100. The first volume 134 includes the first tank 106 and a portion of the first fuel line 108 extending from the first tank 106 to the vaporiser 116. Evacuation of the first volume 134 via ducts 152, 154 thermally insulates the first fuel line 108, ensuring that liquid hydrogen drawn from the first tank 106 remains in liquid form at the fuel pump 112 and until reaching the vaporiser 116. The first volume 134 may also include the input duct 102 and the valve 104.

A duct 156 including a valve 158 couples gaseous hydrogen stored in the second tank 132 to the ullage 105 of the first tank 106, ensuring that liquid hydrogen is provided to the fuel pump 112 with at least a minimum pressure as the first tank 106 empties, thus ensuring that cavitation within the fuel pump 112 is avoided.

The propulsion system 100 further comprises a third tank 164 storing pressurised gaseous nitrogen, the third tank 164 being connected to a second volume 117 surrounding the vaporiser 116 by a duct 166 including a valve 168, thus allowing an inert atmosphere to be provided around the vaporiser 116 to prevent formation of an explosive mixture of air and gaseous hydrogen during operation of the propulsion system 100. The third tank 164 may be filled by via an input duct 160 which includes a valve 162.

Ducts 170, 174, 178 and associated valves 172, 176, 180, 110 allow for gaseous hydrogen from the second tank 132 and gaseous nitrogen from the third tank 164 to be selectively introduced into the first fuel line 108 at a position thereon intermediate the first tank 106 and the fuel pump 112. These ducts and valves, together with the second and third tanks 132, 164 form a purge/prime arrangement for ensuring safe operation of the propulsion system 100. On start-up, nitrogen from the third tank 164 is introduced into the first fuel line 108 in order to displace air therefrom. Gaseous hydrogen from the second tank 132 is then introduced into the first fuel line 108 to displace the gaseous nitrogen and prime the first fuel line 108. On shut-down of the propulsion system 100, gaseous hydrogen from the second tank 132 is introduced into the fuel line 108 in order to displace liquid hydrogen between the valve 110 and the vaporiser 116 and move it into the vaporiser 116. Subsequently, nitrogen is introduced into the fuel line 108 at the valve 110 in order to purge gaseous hydrogen within the fuel line 108 between the valve 100 and the combustion apparatus 194A, 194B of the engines 190A, 190B.

The first tank 106 may be a single individual tank or a tank storage system comprising multiple tanks in which a volume of liquid hydrogen is stored with an ullage. Similarly the second and third tanks 132, 164 may each be a single tank or a tank storage system comprising multiple tanks. For the purposes of this specification, "tank" therefore has a broad meaning including a single tank and also a tank system having more than one tank.

In a variant of the system 100, the APU 142 is an auxiliary hydrogen-burning gas turbine engine arranged to drive an electrical generator which provides electrical power to the power distribution system 146.

A second example propulsion system is similar to the propulsion system 100 of FIG. 2 but has a single propulsive hydrogen-burning gas turbine engine. The second example system may be comprised in a fixed-wing aircraft with the propulsive hydrogen-burning gas turbine engine mounted on the fuselage of the aircraft.

A third example propulsion system, suitable for a helicopter, is similar to the propulsion system 100 of FIG. 2 but has a single hydrogen-burning gas turbine engine comprising a free-power turbine arranged to provide mechanical power to a rotor blade system.

What is claimed is:

1. A propulsion system comprising:
   (i) a propulsive, hydrogen-burning gas turbine engine;
   (ii) a first tank arranged to store liquid hydrogen with an ullage;
   (iii) a first fuel line arranged to convey the liquid hydrogen from the first tank to a combustion apparatus of the propulsive, hydrogen-burning gas turbine engine, the first fuel line including a fuel pump and a vaporiser, wherein the fuel pump is arranged to transport the liquid hydrogen from the first tank to the vaporiser and the vaporiser is arranged to vaporise the liquid hydrogen utilising heat from the propulsive, hydrogen-burning gas turbine engine and provide resulting gaseous hydrogen to the combustion apparatus of the propulsive, hydrogen-burning gas turbine engine and wherein the propulsion system further comprises:
   (iv) a second tank arranged to store compressed gaseous hydrogen;
   (v) a second fuel line arranged to convey the compressed gaseous hydrogen between the second tank and the first fuel line at a position thereon intermediate the vaporiser and the combustion apparatus; and
   (vi) a duct which in operation of the propulsion system connects the compressed gaseous hydrogen stored in the second tank to the ullage of the first tank, and wherein
   the first tank and a portion of the first fuel line extending from the first tank to the vaporiser are contained within a first volume which is arranged for evacuation during operation of the fuel system, and
   the propulsion system further comprises a fuel cell stack and a third fuel line arranged to convey the compressed gaseous hydrogen from the second tank to the fuel cell stack and an electric vacuum pump arranged to receive electrical power from the fuel cell stack and substantially evacuate the first volume.

2. The propulsion system according to claim 1 wherein the fuel pump is an electric pump and the fuel cell stack is arranged to provide the electrical power to the fuel pump.

3. The propulsion system according to claim 1 wherein the fuel cell stack is arranged to provide the electrical power to an electric starter-motor comprised in the propulsive, hydrogen-burning gas turbine engine.

4. The propulsion system according to claim 3 wherein the fuel pump is an electric pump and the fuel cell stack is arranged to provide the electrical power to the fuel pump.

5. The propulsion system according to claim 1 wherein:
   (i) the fuel pump is an electric pump and the fuel cell stack is arranged to provide the electrical power to the fuel pump; and/or
   (ii) the fuel cell stack is arranged to provide electrical power to an electric starter motor comprised in the propulsive, hydrogen-burning gas turbine engine.

6. The propulsion system according to claim 1 further comprising an apparatus for maintaining an inert atmosphere within a second volume which includes a portion of the first fuel line including the vaporiser.

7. The propulsion system according to claim 6 wherein said apparatus comprises a third tank arranged to store compressed gaseous nitrogen and a duct coupling the third tank to said second volume.

8. The propulsion system according to claim 7 further comprising an apparatus arranged to selectively convey the compressed gaseous hydrogen from the second tank and the compressed gaseous nitrogen from the third tank to the first fuel line at a position thereon between the first tank and the fuel pump.

9. The propulsion system according to claim 1 further comprising a third tank arranged to store gaseous nitrogen and an apparatus arranged to selectively convey the compressed gaseous hydrogen from the second tank and the gaseous nitrogen from the third tank to the first fuel line at a position thereon between the first tank and the fuel pump.

10. The propulsion system according to claim 1 further comprising an electrical power distribution system, the fuel cell stack being arranged to provide the electrical power to the electrical power distribution system.

11. The propulsion system according to claim 1 wherein the vaporiser comprises a heat exchanger arranged to receive compressor bleed air from the propulsive, hydrogen-burning gas turbine engine and transmit heat from the compressor bleed air to the liquid hydrogen within the first fuel line.

12. The propulsion system according to claim 1 wherein the vaporiser comprises a heat-exchanger arranged to transmit heat from oil within an oil system of the propulsive, gas turbine engine to the liquid hydrogen within the first fuel line.

13. The propulsion system according to claim 1 wherein the vaporiser comprises a heat-exchanger arranged to transmit heat from an exhaust flow of the propulsive, gas turbine engine to the liquid hydrogen within the first fuel line.

14. An aircraft comprising the propulsion system according to claim 1.

15. The aircraft according to claim 14 wherein the aircraft is an aeroplane or a helicopter.

* * * * *